United States Patent
Davis et al.

(10) Patent No.: US 9,573,325 B2
(45) Date of Patent: Feb. 21, 2017

(54) MOULD SHELL SECTION FOR A MOULD SHELL FOR A WIND TURBINE BLADE, MOULD SHELL AND METHOD USING THE MOULD SHELL SECTIONS

(71) Applicant: Vestas Wind Systems A/S, Aarhus N. (DK)

(72) Inventors: Olav Davis, Hamble (GB); Mohana Krishna Dhamodharan, Trichy (IN); Damien Rajasingam, East Cowes (GB); Glenn Thomas, Southampton Hampshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 107 days.

(21) Appl. No.: 14/369,948

(22) PCT Filed: Dec. 20, 2012

(86) PCT No.: PCT/DK2012/050488
§ 371 (c)(1),
(2) Date: Jun. 30, 2014

(87) PCT Pub. No.: WO2013/097859
PCT Pub. Date: Jul. 4, 2013

(65) Prior Publication Data
US 2014/0338815 A1 Nov. 20, 2014

Related U.S. Application Data

(60) Provisional application No. 61/583,669, filed on Jan. 6, 2012.

(30) Foreign Application Priority Data

Dec. 30, 2011 (DK) .......................... PA 2011 70771

(51) Int. Cl.
*B32B 41/00* (2006.01)
*B29C 70/34* (2006.01)
(Continued)

(52) U.S. Cl.
CPC ............. *B29C 70/345* (2013.01); *B29C 33/30* (2013.01); *B29C 33/301* (2013.01);
(Continued)

(58) Field of Classification Search
CPC ...... B29C 70/345; B29C 33/30; B29C 33/301; B29C 33/303; B29C 33/005; B29C 70/34; B29D 99/0025; Y02P 70/523; B29L 2031/08; B29L 2031/085
(Continued)

(56) References Cited

U.S. PATENT DOCUMENTS

| 5,332,384 A | 7/1994 | Abramat |
| 2008/0302486 A1 | 12/2008 | Jones et al. |
| 2009/0250847 A1* | 10/2009 | Burchardt ........... B29C 33/0061 264/511 |

FOREIGN PATENT DOCUMENTS

| DE | 19833869 C1 | 3/2000 |
| EP | 2316629 A1 | 5/2011 |

(Continued)

OTHER PUBLICATIONS

International Bureau, Notification Concerning Transmittal of International Preliminary Report on Patentability, issued in corresponding International Application No. PCT/DK2012/050488, dated Jul. 1, 2014, 9 pages.

(Continued)

*Primary Examiner* — Michael N Orlando
*Assistant Examiner* — Joshel Rivera
(74) *Attorney, Agent, or Firm* — Wood Herron & Evans LLP

(57) ABSTRACT

A mold shell for forming a wind turbine blade (20) comprises at least two mold shell sections (401, 402) each having a mold surface with a recessed portion (419, 420) adjoining the connecting edges (407, 408) between the mold shell sections. A bridging sheet (421) is accommodated in the recessed portions (419, 420) of the mold shell sections (401, 402). The bridging sheet (421) fills up the recessed portions.

19 Claims, 8 Drawing Sheets

(51) Int. Cl.
| | | |
|---|---|---|
| *B29C 33/30* | (2006.01) | |
| *B29D 99/00* | (2010.01) | |
| *B29L 31/08* | (2006.01) | |
| *B29C 33/00* | (2006.01) | |

(52) U.S. Cl.
CPC ........ *B29C 33/303* (2013.01); *B29D 99/0025* (2013.01); *B29C 33/005* (2013.01); *B29C 70/34* (2013.01); *B29L 2031/08* (2013.01); *B29L 2031/085* (2013.01); *Y02P 70/523* (2015.11)

(58) Field of Classification Search
USPC ....... 156/64, 273.9, 350, 378, 379; 264/102, 264/105, 258, 261, 511
See application file for complete search history.

(56) References Cited

FOREIGN PATENT DOCUMENTS

| | | |
|---|---|---|
| FR | 2943271 A1 | 9/2010 |
| GB | 2404612 A | 2/2005 |
| WO | 2010027251 A2 | 3/2010 |
| WO | 2011035539 A1 | 3/2011 |

OTHER PUBLICATIONS

International Searching Authority, International Search Report and Written Opinion issued in corresponding PCT Application No. PCT/DK2012/05488 dated Nov. 20, 2013, 16 pages.

Danish Patent and Trademark Office, Combined search and examination report issued in corresponding DK application No. PA 2011 70771 dated Aug. 13, 2012, 4 pages.

* cited by examiner

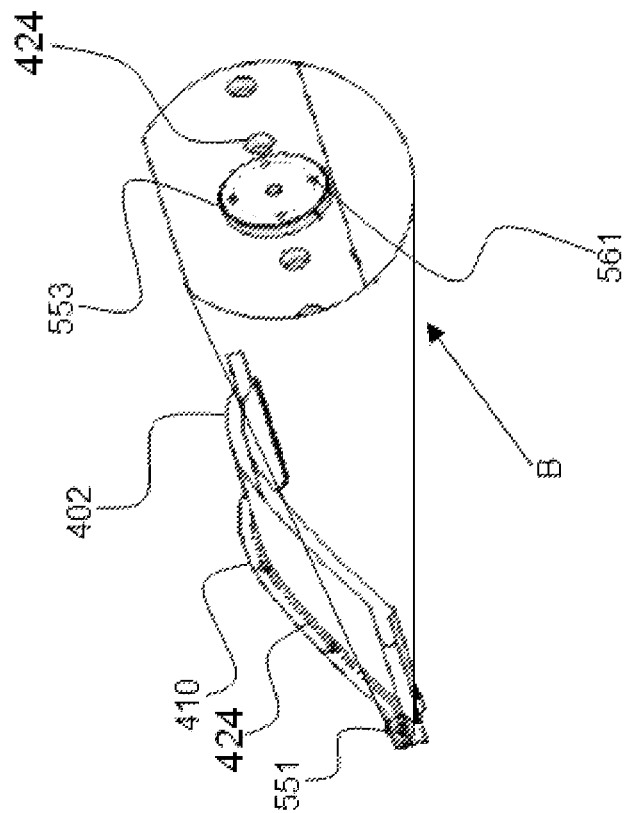
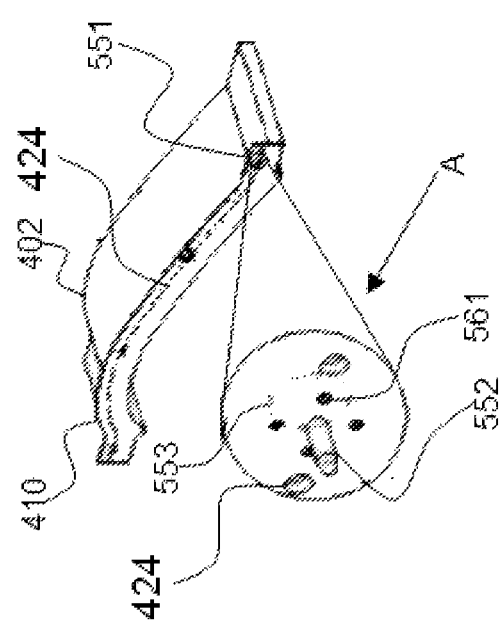
Fig. 8a
Fig. 8b

MOULD SHELL SECTION FOR A MOULD SHELL FOR A WIND TURBINE BLADE, MOULD SHELL AND METHOD USING THE MOULD SHELL SECTIONS

BACKGROUND OF THE INVENTION

The present invention is directed to a mould shell section for a mould shell for forming a wind turbine blade, to a mould shell for forming a wind turbine blade, to adjustment means for adjusting adjacent mould shell sections to each other, and a method for providing a smooth transition between adjacent mould shell sections.

DESCRIPTION OF THE RELATED ART

A typical wind turbine as known in the art comprises a tapered wind turbine tower and a wind turbine nacelle positioned on top of the tower. A wind turbine rotor with a number of wind turbine blades is connected to the nacelle through a low speed shaft, which extends out of the nacelle front, as illustrated in FIG. 1. A radius of the rotor influences the performance of the wind turbine. For example, a wind turbine with an increased radius may deliver power even in lighter wind conditions. Likewise, a wind turbine with an increased radius may deliver more power than a given wind turbine. The radius of the rotor is substantially determined by a length of the wind turbine blades. Hence, the blades of recently erected wind turbines have become longer and longer. The length of the blades of the wind turbine in the shown example is approximately 40 meter, but blade lengths between 25 and 70 meters are also usual.

Production facilities for the blades have to adapt to their increasing size. Outer shells of wind turbine blades are usually laminates formed from a fibre-reinforced composite, such as a resin reinforced by a fibre material such as glass fibre material or carbon fibre material, or a combination thereof. Hence, moulds for forming the fibre-reinforced composite of the outer shells have to be adjusted in their size and become just as long as the blades or even slightly longer.

Since the blades became longer and longer, road transport of the blades has been increasingly difficult as roads are not dimensioned for these long transport vehicles. Likewise, the moulds having about the same size as the blades are difficult to transport, such that production facilities for full size moulds have to be established in the neighbourhood of the production facilities for the blades.

Recently, rotor blades have been moulded in parts which may be arranged across the length of the rotor blade. Accordingly, DE 198 33 869 C5 discloses a mould for wind turbine rotor blades formed of fibre-reinforced composites. The mould is split into mould parts. In each mould part a section of the blade is formed. The completed sections are put together thereafter.

Further, it is known from EP 2 316 629 A1 to provide a modular mould system comprised of a number of mould sections. The mould sections may be assembled to form a particular variation of a blade. A junction of one mould section to an adjacent mould section is formed by a flexible end segment. The end segment matches substantially the contour of the adjacent mould section. The end segment is adjusted to ensure a smooth transition between the two mould sections. In some embodiments the end segment is arranged to provide an overlap with the adjacent mould section.

The object of the present invention is to provide for an improved transition between sections of a mould for a wind turbine blade.

SUMMARY OF THE INVENTION

The invention provides a mould shell section for a mould shell for forming a wind turbine blade comprising a mould surface for receiving a fibre-reinforced composite for a blade a connecting edge arranged laterally at the mould shell section, said connecting edge being adapted to provide an interface for another mould shell section of said mould shell; and said mould surface having a recessed portion adjoining said connecting edge, said recessed portion being adapted to accommodate a portion of a bridging sheet.

The invention further provides a mould shell for forming a wind turbine blade comprising at least two such mould shell sections, said mould shell sections engaging each other along their connecting edges, and a bridging sheet accommodated in the recessed portion of the mould shell sections wherein the bridging sheet is arranged to fill up the recessed portion.

The invention also provides an adjustment means for mutually adjusting first and second mould shell sections of a mould shell for forming a wind turbine blade, said adjustment means comprising a frame for attachment of said adjustment means to the first mould shell section; a guide part being adapted to engage the second mould shell section and being adapted to slide in the frame in an adjustment direction to guide an engagement position of the first mould shell section with the second mould shell section in the adjustment direction; and means for adjusting and/or fixing a position of said guide part with respect to said frame.

The invention likewise provides a method for providing a smooth transition between adjacent mould shell sections for a mould shell for forming a wind turbine blade, comprising the steps of providing a first mould shell section comprising a first mould surface, a first connecting edge arranged laterally on the first mould shell section and said first mould surface having a first recessed portion adjoining said first connecting edge; providing a second mould shell section comprising a second mould surface, a second connecting edge arranged laterally on the second mould shell section and said second mould surface having a second recessed portion adjoining said second connecting edge, wherein the second connecting edge is shaped to match the first connecting edge; arranging the first mould shell section and the second mould shell section adjacent to each other such that the first and second connecting edges face each other; adjusting said first and second mould shell sections such that the first and second mould surfaces are approximately flush with respect to each other in areas of the mould surfaces adjacent to the recessed portions; and applying a bridging sheet in the first and second recessed portions such that the bridging sheet fills up the recessed portions.

The invention also provides a method for manufacturing a wind turbine blade, comprising the steps of providing a first mould shell section comprising a first mould surface, a first connecting edge arranged laterally on the first mould shell section and said first mould surface having a first recessed portion adjoining said first connecting edge; providing a second mould shell section comprising a second mould surface, a second connecting edge arranged laterally on the second mould shell section and said second mould surface having a second recessed portion adjoining said second connecting edge, wherein the second connecting edge is shaped to match the first connecting edge; arranging the first mould shell section and the second mould shell section adjacent to each other such that the first and second connecting edges face each other; adjusting said first and second mould shell sections such that the first and second mould surfaces are approximately flush with respect to each other in areas of the mould surfaces adjacent to the recessed portions; applying a bridging sheet in the first and second recessed portions such that the bridging sheet fills up the recessed portions; providing a mould shell comprising the first and second mould shell sections; and placing fibres and a resin in the mould shell, said fibres and said resin forming a first shell half of the wind turbine blade.

Further aspects of the invention are set forth in the dependent claims, the following description and the drawings.

BRIEF DESCRIPTION OF THE DRAWINGS

Embodiments of the present invention are explained by way of example with respect to the accompanying drawings, in which:

FIG. 8a shows a perspective view of a mould shell section with a flange in a view to an engagement side of the flange and a number of transfer means attached to the flange, FIG. 8b shows a perspective view of the mould shell section of FIG. 8a in a view to the side opposite to the engagement side of the flange.

DETAILED DESCRIPTION OF EMBODIMENTS

Figure 1:
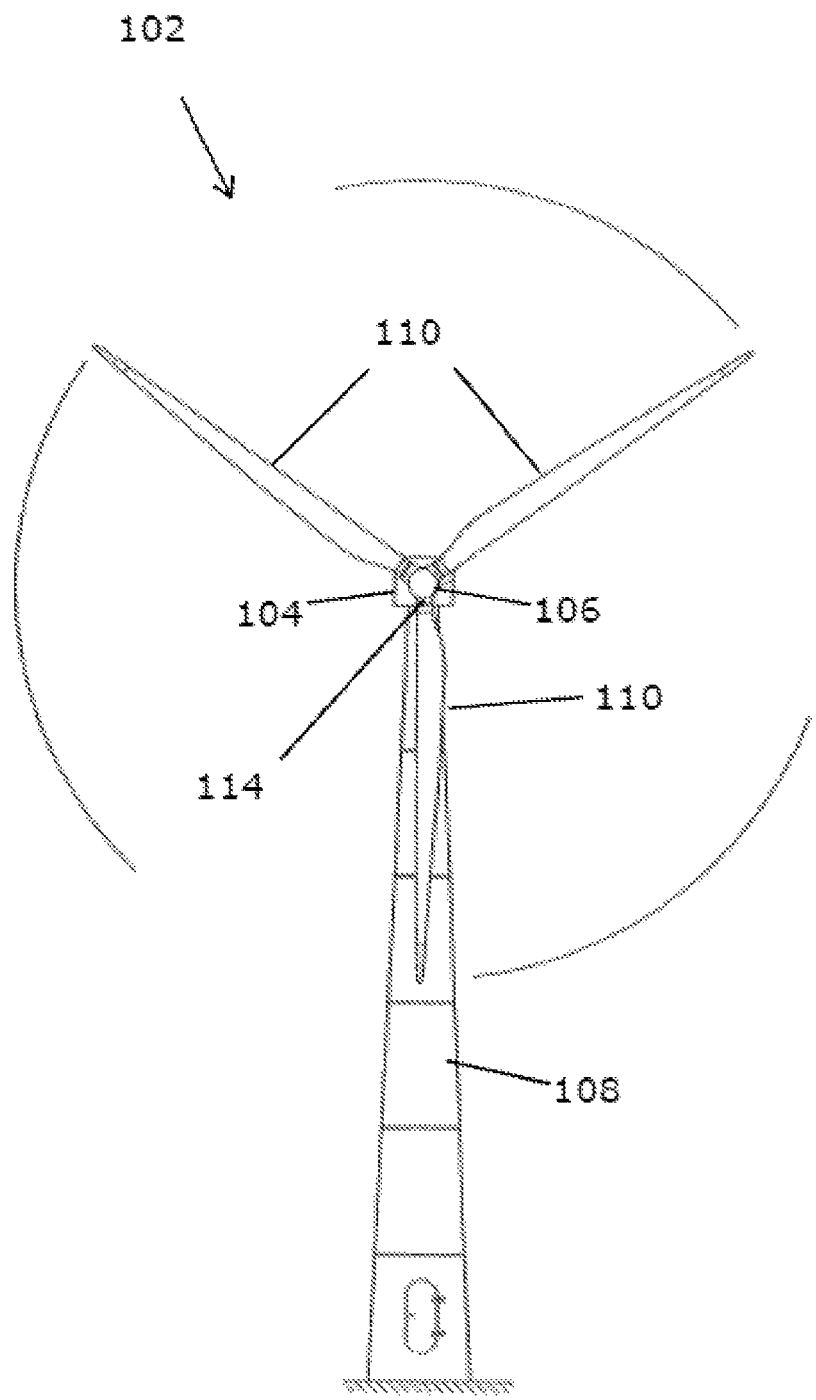
FIG. 1 illustrates a large modern wind turbine according to the state of the art, as seen from the front.

FIG. 1 shows a wind turbine generator 102 with a nacelle 104, and a hub 106 pivotally mounted to the nacelle 104 via a shaft. The nacelle 104 is mounted on a wind turbine tower 108 via a rotary joint. The hub 106 of the wind turbine includes three wind turbine blades 110 attached to the hub in a root end 114 of the blades. The hub 106 rotates around a shaft centre axis of the wind turbine in a rotational plane substantially perpendicular to the centre axis.

Before proceeding further with a detailed description of the embodiments of the invention, some general aspects of the present invention are discussed. A mould shell for forming a wind turbine blade comprises a number of mould shell sections. Each mould shell section comprises a mould surface for receiving a fibre-reinforced composite for a blade, a connecting edge arranged laterally at the mould shell section, said connecting edge being adapted to provide an interface for another mould shell section of said mould, and said mould surface having a recessed portion adjoining said connecting edge, said recessed portion being adapted to accommodate a portion of a bridging sheet.

In some embodiments the surface of the recessed portion is adapted to enable adherence to a bridging sheet comprising a fibre-reinforced composite and/or a gel coat.

In some embodiments said recessed portion is dimensioned to allow a bridging sheet accommodated in the recessed portion to form a flush surface with the mould surface.

In some embodiments the recessed portion recesses from a normal level of the mould surface, the recessed portion comprising a straight section having an oblong cross section adjoining the connecting edges, and a tapered section tapering from the level of the straight section to the level of the normal level of the mould surface.

In some embodiments the mould shell section comprises an adjustment means for adjusting said mould shell section and another mould shell section to each other, wherein the adjustment means are arranged at the mould shell section adjacent to the connecting edge.

In some embodiments the mould shell section comprises a flange extending along the connecting edge, perpendicularly to the mould surface and on a side of the mould shell section opposing the mould surface, said flange being arranged for attachment of said mould shell section to a flange of another mould shell section and/or having facilities for attachment of adjustment means for adjusting said mould shell section to the other mould shell section.

In some embodiments said flange having preattached a part of the adjustment means.

In some embodiments said flange is adapted to be bolted to the flange of the other mould shell section.

A mould shell for forming a wind turbine blade comprises at least two such mould shell sections, wherein said mould shell sections engage each other along their connecting edges, and a bridging sheet accommodated in the recessed portions of the mould shell sections, wherein the bridging sheet is arranged to fill up the recessed portion.

In some embodiments said bridging sheet comprises a laminate comprising a woven fabric and/or a resin.

In some embodiments said bridging sheet comprises a gel coat covering the laminate and being matched to the mould surfaces of the mould shell sections.

For mutually adjusting first and second mould shell sections of a mould shell for forming a wind turbine blade adjustment means are provided, said adjustment means comprising a frame for attachment of said adjustment means to the first mould shell section, a guide part being adapted to engage the second mould shell section and being adapted to slide in the frame in an adjustment direction to guide an engagement position of the first mould shell section with the second mould shell section in the adjustment direction, and means for adjusting and/or fixing a position of said guide part with respect to said frame.

As used herein, a frame is understood as an arrangement of structural parts giving form or support to something.

In some embodiments guiding an engagement position of the first mould shell section with the second mould shell section comprises guiding said second mould shell section in the adjustment direction.

In some embodiments said guide allows free travel of the engagement position transversally to the adjustment direction.

In some embodiments said means for adjusting and/or fixing a position comprise a worm gear and said guide part is adapted to slide in said frame in response to an action of the worm gear.

In some embodiments the means for adjusting and/or fixing a position comprises at least one screw threaded into said frame and engaging said guide part in an elongated groove extending in parallel to the adjustment direction.

In some embodiments said guide part is arranged on a side of the frame facing away from the side for attachment to a mould shell section.

In some embodiments the adjustment means further comprise a spigot for transferring the movement of the guide part to the second mould shell section.

In some embodiments the adjustment means comprise a transfer means attached to the second mould shell section, wherein said transfer means comprises said spigot, and wherein said guide part comprises an elongated aperture extending transversely to the adjustment direction and being adapted to engage the spigot.

In some embodiments said frame has a frame aperture, which is aligned to said elongated aperture of said guide part. The frame aperture extends in the adjustment direction and in the direction transversal to the adjustment direction by approximately at least the length of the elongated aperture of the guide part. The length of the elongated aperture refers to the dimension of the elongated aperture along its elongation.

In some embodiments said spigot is attached to the guide part. The respective other mould shell section may comprise a hole and the spigot may engage the hole. The hole may be shaped as an elongated aperture.

For a smooth transition between adjacent mould shell sections a first mould shell section is provided comprising a first mould surface and a first connecting edge arranged laterally on the first mould shell section, said first mould surface having a first recessed portion adjoining said first connecting edge. A second mould shell section is provided comprising a second mould surface and a second connecting edge arranged laterally on the second mould shell section, said second mould surface having a second recessed portion adjoining said second connecting edge, wherein the second connecting edge is shaped to match the first connecting edge. The first mould shell section and the second mould shell section are arranged adjacent to each other such that the first and second connecting edges face each other. The first and second mould shell sections are adjusted such that the first and second mould surfaces are approximately flush with respect to each other in areas of the mould surfaces adjacent to the first and second connecting edges. A bridging sheet is applied in the first and second recessed portions such that the bridging sheet fills up the recessed portions.

A smooth transition as used herein is meant to refer to a transition between two adjacent mould shell sections which does not induce a step in a laminate formed in the mould shell.

In some embodiments adjusting said first and second mould shell sections is carried out by adjustment means adapted to adjust a height of said first and second mould shell sections with respect to each other and to provide free travel of said first and second mould shell sections with respect to each other in a chord-wise direction. A chord-wise direction as used herein refers to a direction from a part of the mould shell provided for an intended trailing edge of a blade to be formed to a part of the mould shell provided for an intended leading edge of such blade. As used herein, a height refers to a distance to a support surface of a mould shell.

In some embodiments said adjustment means are fixed to the first and/or second mould shell sections adjoining the corresponding connecting edge.

In some embodiments said first mould shell section comprises a first flange running along the first connecting edge perpendicularly to the first mould surface on a side of the first mould shell section opposing the first mould surface, and said second mould shell section comprises a second flange running along the second connecting edge perpendicularly to the second mould surface on a side of the second mould shell section opposing the second mould surface, wherein these embodiments further comprise the step of arranging an adjustment actuator of said adjustment means on the first flange and arranging a spigot on the second flange, such that the spigot protrudes said first and second flanges and said adjustment actuator.

In some embodiments further adjustment means are arranged to adjust said first and second mould shell sections with respect to each other in a chord-wise direction and provide free travel of said first and second mould shell sections in a height direction.

In some embodiments said first and second mould shell sections are fixed to each other by means of bolts after being adjusted.

In some embodiments applying a bridging sheet comprises applying a laminate comprising a dry-woven fabric and/or a resin.

In some embodiments applying a bridging sheet comprises applying a gel coat and matching said gel coat up to said first and second mould surfaces.

For manufacturing a wind turbine blade a first mould shell section is provided comprising a first mould surface and a first connecting edge arranged laterally on the first mould shell section, said first mould surface having a first recessed portion adjoining said first connecting edge. A second mould shell section is provided comprising a second mould surface and a second connecting edge arranged laterally on the second mould shell section, said second mould surface having a second recessed portion adjoining said second connecting edge, wherein the second connecting edge is shaped to match the first connecting edge. The first mould shell section and the second mould shell section are arranged adjacent to each other such that the first and second connecting edges face each other. The first and second mould shell sections are adjusted such that the first and second mould surfaces are approximately flush with respect to each other in areas of the mould surfaces adjacent to the first and second connecting edges. A bridging sheet is applied in the first and second recessed portions such that the bridging sheet fills up the recessed portions. A mould shell is provided comprising the first and second mould shell sections, and fibres and a resin are placed in the mould shell. The fibres and the resin form a first shell half of the wind turbine blade.

In some embodiments the method further comprises the step of providing a second shell half of the blade, positioning the second shell half on the first shell half, and coupling the first and second blade shell halves to each other.

Figure 2:
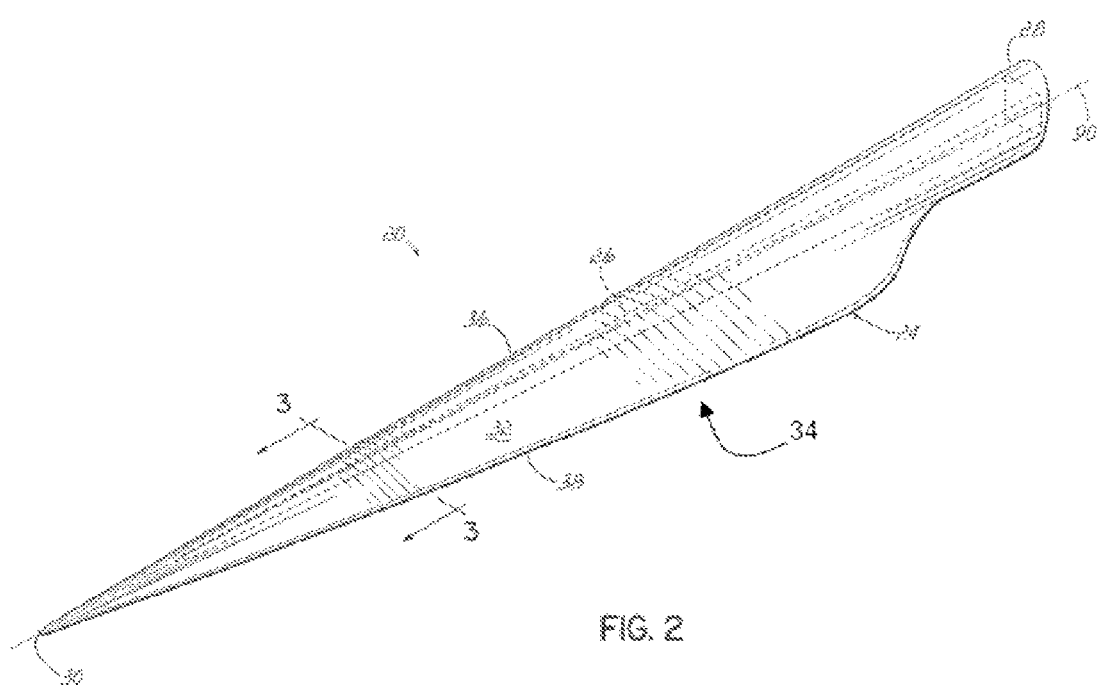
FIG. 2 shows a single wind turbine blade as used in a wind turbine.

FIG. 2 shows a single wind turbine blade 20. The wind turbine blade 20 is an elongate structure having an outer shell 24 disposed about an inner support element or spar 26. The outer shell 24 may be optimally shaped to give the blade 20 the desired aerodynamic properties to generate lift, while the spar 26 provides the structural aspects (e.g., strength, stiffness, etc.) to blade 20. The elongate blade 20 includes a root end 28 which is coupled to the central hub 18 when mounted to the hub 106, and a tip end 30 on a side opposite to the root end 28. The outer shell 24 includes a first, upper shell half 32 on the suction side of the blade 20, and a second, lower shell half 34 on the pressure side of the blade 20. The upper and lower shell halves 32, 34 are coupled together along a leading edge 36 and a trailing edge 38 located opposite one another across a width of the blade 20.

Figure 3:
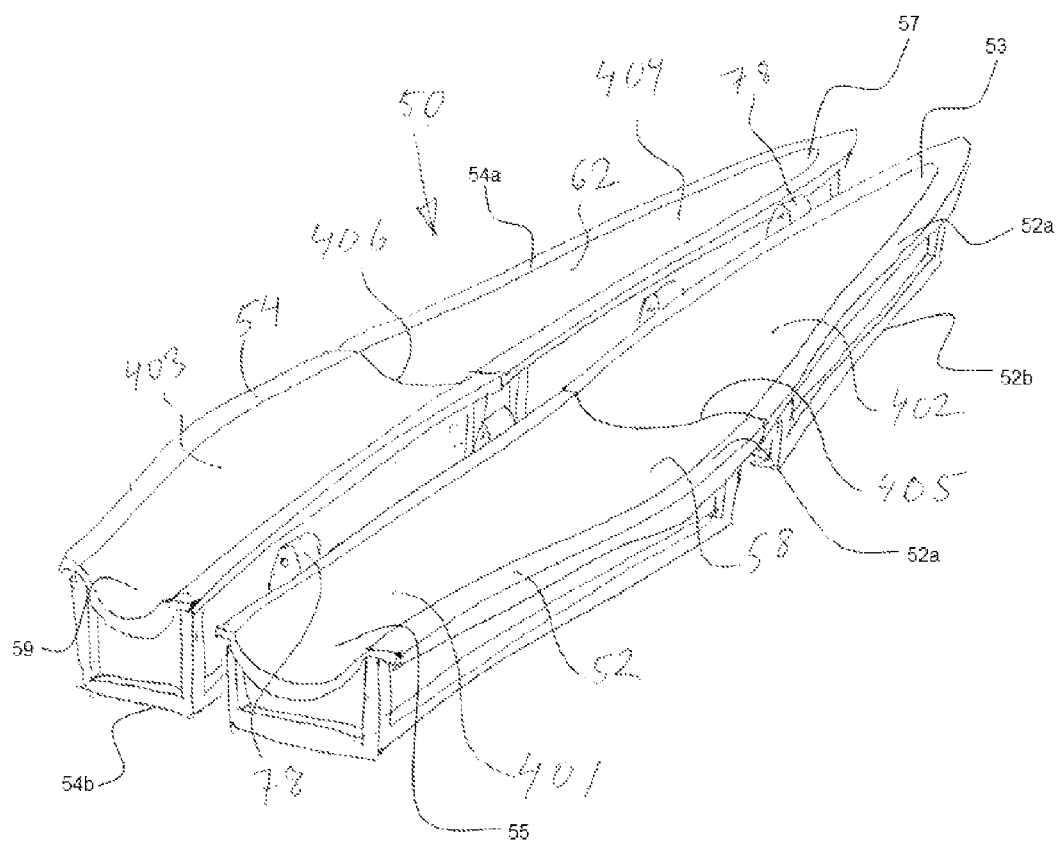
FIG. 3 shows a moulding apparatus for forming wind turbine blades.

FIG. 3 shows a moulding apparatus 50 for forming rotor blades such as the blade 20 described above. The moulding apparatus 50 includes a first mould half 52 and a second mould half 54 positioned next to each other. The first mould half 52 is configured to be used to at least partially form the first shell half 32 of the blade 20 and the second mould half 54 is configured to be used to at least partially form the second shell half 34 of the blade 20. To this end, the first mould half 52 includes a first contoured mould surface 58 generally corresponding to a negative of the contoured surface of the first shell half 32. Similarly, the second mould half 54 includes a second contoured mould surface 62 generally corresponding to a negative of the contoured surface of the second shell half 34. The first mould half 52 comprises a first mould shell half 52a forming the first contoured mould surface 58 and a first support structure 52b to support the first mould shell half 52a. Likewise, the second mould half 54 comprises a second mould shell half 54a forming the second contoured mould surface 62 and a second support structure 54b to support the second mould shell half 54a. In some embodiments, the first and second mould shell halves 52a, 54a are formed from a fibre-reinforced composite. In some embodiments the fibre-reinforced composite comprises resin, carbon fibre and/or fibreglass. In some embodiments the first and second support structures are formed by metal frames such as steel frames.

The first mould shell half 52a includes a first tip mould portion 53 for forming an upper tip end half of the upper shell half 32 and a first root mould portion 55 for forming an upper root end half of the upper shell half 32. Likewise, the second mould shell half 54a includes a second tip mould portion 57 for forming a lower tip end half of the lower shell half 34 and a second root mould portion 59 for forming a lower root end half of the lower shell half 34.

As can be seen in FIG. 3, the first and second mould halves 52, 54 have a split structure, separated along a first separation line 405 of the first mould shell half 52a and a second separation line 406 of the second mould shell half 54a. The first separation line 405 separates the first mould shell half 52a into first mould shell sections 401, 402 distributed in a longitudinal direction of the mould. The longitudinal direction extends from the first and second root mould portions 55, 59 to the first and second tip mould portions 53, 57. In the depicted embodiment, the first mould shell sections 401, 402 include a first root mould shell section 401 comprising the first root mould portion 55 and a tip mould shell section 402 comprising the first tip mould portion 53. The second separation line 406 separates the second mould shell half 54a into second mould shell sections 403, 404 distributed in the longitudinal direction of the mould. In the embodiment the second mould shell sections 403, 404 include a second root mould shell section 403 comprising the second root mould portion 59 and a second tip mould shell section 404 comprising the second tip mould portion 57. The first and second separation lines 405, 406 extend transversely in relation to the longitudinal direction of the mould, in a chord-wise direction.

In some embodiments the first mould shell half 52a is separated into a first root mould shell section 401 and a first tip mould shell section 402 to facilitate transporting and handling the first mould shell half 52a. Likewise, the second mould shell half 54a in the embodiment is separated into the second root mould shell section 403 and the second tip mould shell section 404.

In the depicted embodiment the first support structure 52b is separated into parts, one part supporting the first root mould shell section 401 and the other part supporting the tip mould shell section 402. Likewise, the second support structure 54b of the embodiment is separated into a part supporting the second root mould shell section 403 and another part supporting the second tip mould shell section 404. In other embodiments root and tip mould shell sections may be arranged on a single support structure for each mould shell half.

In some embodiments one of the first and second mould halves 52, 54 is movable relative to the other such that first and second mould halves 52, 54 may be used to couple the first and second blade shell halves 32, 34 to each other and to form the outer shell 24 of the blade 20. In some embodiments, the moulding apparatus 50 has a clamshell configuration having a fixed mould half and a movable mould half movable relative to the fixed mould half so as to come to rest on top of the fixed mould half. For example, the first mould half 52 may be configured to be fixed to ground and the second mould half 54 may be configured to be movable relative to the first mould half 52 and relative to ground.

With such a clamshell configuration, the second mould half 54 may be movable relative to the first mould half 52 between an opened position, as illustrated in FIG. 3, and a closed position with the second mould half 54 resting on the first mould half such that the first and second contoured mould surfaces 58, 62 form a cavity between the first and second mould halves 52, 54. In the opened position, the contoured surfaces 58, 62 of the first and second mould halves 52, 54, respectively, are exposed such that the blade shell halves 32, 34 may be formed therein. In the closed position with the second mould half 54 positioned on top of the first mould half 52 respective pairs of confronting edges of the first and second blade shell halves 32, 34 may be generally aligned and in contact or near contact with each other so as to be coupled together.

In the depicted embodiment the moulding apparatus 50 includes a turner assembly 78 to effectuate movement of the second mould half 54 relative to the first mould half 52. The turner assembly 78 is positioned between the first and second mould halves 52, 54 when in the opened position. The turner assembly 78 includes a hinge or pivot mechanism. Accordingly, the second mould half 54 is adapted to rotate about a pivot axis defined by the hinge or the pivot mechanism.

Figure 4:
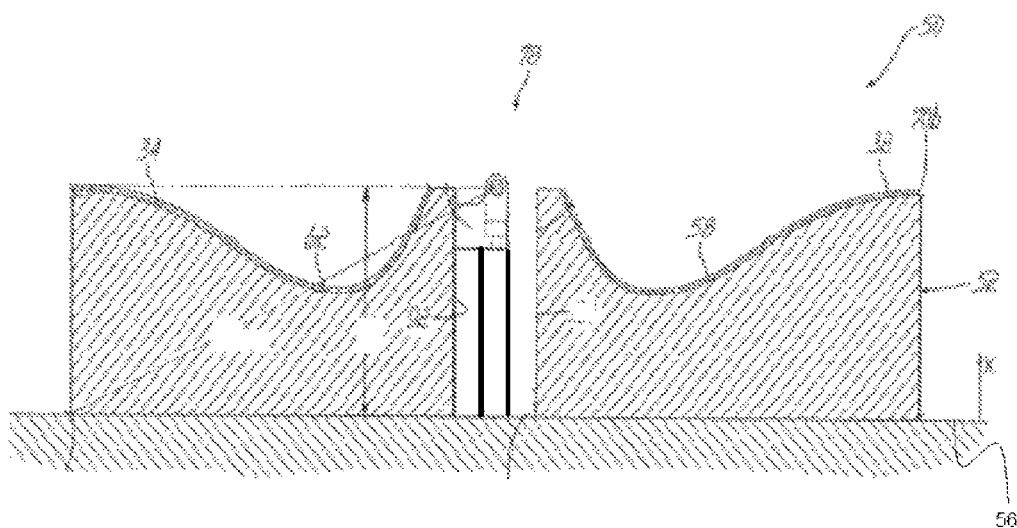
FIG. 4 shows a cross sectional view of the moulding apparatus as seen from root mould portions.

FIG. 4 shows a cross section of the moulding apparatus 50 as seen from the first and second root mould portions 55, 59. In the depicted configuration the portions of the blade shell halves 32, 34 forming the leading edge 36 are arranged adjacent to the turner assembly 78. In this configuration the portions of the blade shell halves 32, 34 forming the trailing edge 38 of the blade 20 are arranged on the outer sides of the moulding apparatus 50. For the blade shell halves 32, 34 fibre material and resin are applied in the first and second mould halves 52, 54 from above.

The first and second mould halves 52, 54 are positioned on a support surface 56, such as the ground, floor, platform, etc. of a manufacturing facility.

Further embodiments of the first and second mould shell halves 52*a*, 54*a* have three or more mould shell sections each separated along separation lines. In some of the embodiments all separation lines run in a transversal direction and the mould shell sections are distributed in a longitudinal direction of the mould. In other embodiments the separation lines run in transversal and longitudinal directions.

Figure 5A:
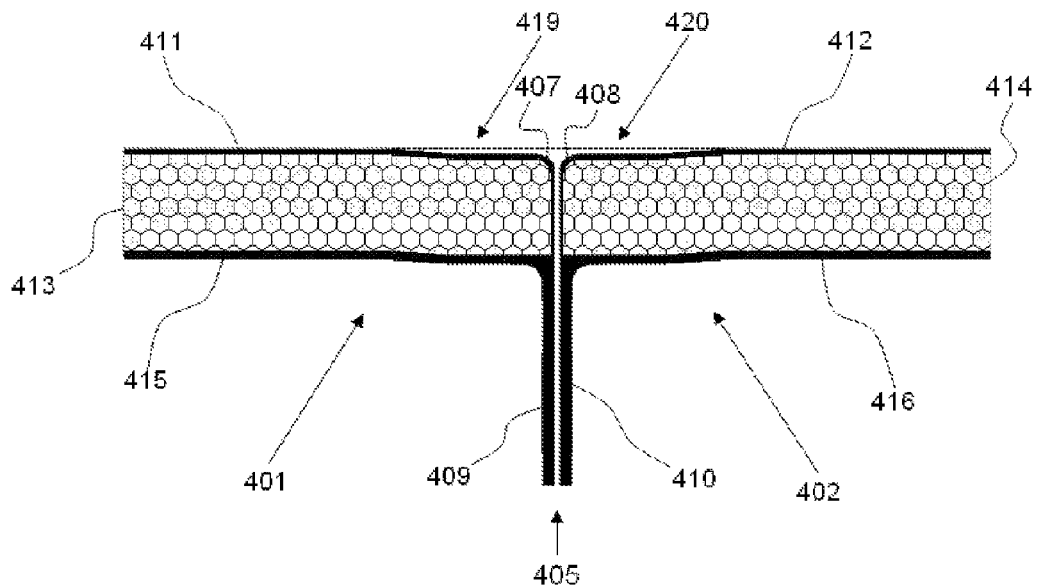
FIG. 5a shows a cross sectional view of a separation line between mould shell sections before attachment as seen from the side.

The following description is equally applicable for the first mould half 52 and for the second mould half 54, such that reference is made exemplarily to the root mould shell section 401 and the tip mould shell section 402 without distinguishing first and second mould shell sections. The teachings are likewise applicable for mould shells with three or more mould shell sections arranged longitudinally or chord-wise FIG. 5*a* shows the separation line 405 between the root mould shell section 401 and the tip mould shell section 402 before attachment in a cross sectional view as seen from the side. The separation line 405 runs between a connecting edge 407 of the root mould shell section 401 and a connecting edge 408 of the tip mould shell section 402. In FIG. 5*a* the connecting edges 407, 408 are shown with a gap in between, as it may be present before connecting the root mould shell section 401 and the tip mould shell section 402. When the root mould shell section 401 and the tip mould shell section 402 are connected, there will be no gap left. In the depicted embodiment the connecting edges 407, 408 extend transversely in relation to the longitudinal direction of the mould along the separation line 405.

The root mould shell section 401 comprises a root section mould surface 411, a root section back cover 415 and a root section spacing structure 413 sandwiched between the root section mould surface 411 and the root section back cover 415. The root section mould surface 411 forms the contoured mould surface 58 in the area of the first root mould portion 55. The root section back cover 415 and the root section spacing structure 413 provide a support of the root section mould surface 411 at least partially over the area of the root mould shell section 401. In some embodiments the root section mould surface 411 and the root section back cover 415 are formed from a fibre-reinforced composite such as a resin reinforced by a fibre material such as glass fibre material or carbon fibre material, or a combination thereof. In some embodiments the root section mould surface 411 is covered with a coat. In some embodiments the coat is a release layer preventing adhesion of the resin to the root section mould surface 411. In some embodiments the coat is a gel coat. In some embodiments, the root section spacing structure 413 is formed by a honeycomb structure.

Likewise, the tip mould shell section 402 comprises a tip section mould surface 412, a tip section back cover 416 and a tip section spacing structure 414 sandwiched between the tip section mould surface 412 and the tip section back cover 416. The tip section mould surface 412 forms the contoured mould surface 58 in the area of the first tip mould portion 53. Further details of the first tip mould shell section 402 are arranged corresponding to the root mould shell section 401 as explained above.

The root section mould surface 411 has a recessed portion 419 adjoining the connecting edge 407 of the root mould shell section 401. Likewise, the tip section mould surface 412 has a recessed portion 420 adjoining the connecting edge 408. The recessed portions 419, 420 extend along the connecting edges 407, 408. In FIG. 5*a* the recessed portions 419, 420 are shown by reference to a dashed line signifying the normal level of the root and tip section mould surfaces 411, 412. When the root mould shell section 401 and the tip mould shell section 402 are in abutment, a bridging sheet may be accommodated in the recessed portions 419, 420, such that each of the recessed portions 419, 420 accommodates a respective portion of the bridging sheet. Thereby the bridging sheet covers the separation line 405 between the root mould shell section 401 and the tip mould shell section 402. To this end the recessed portions 419, 420 are shaped according to the intended bridging sheet, for example providing space for a broad, lengthy and flat band.

Figure 5B:
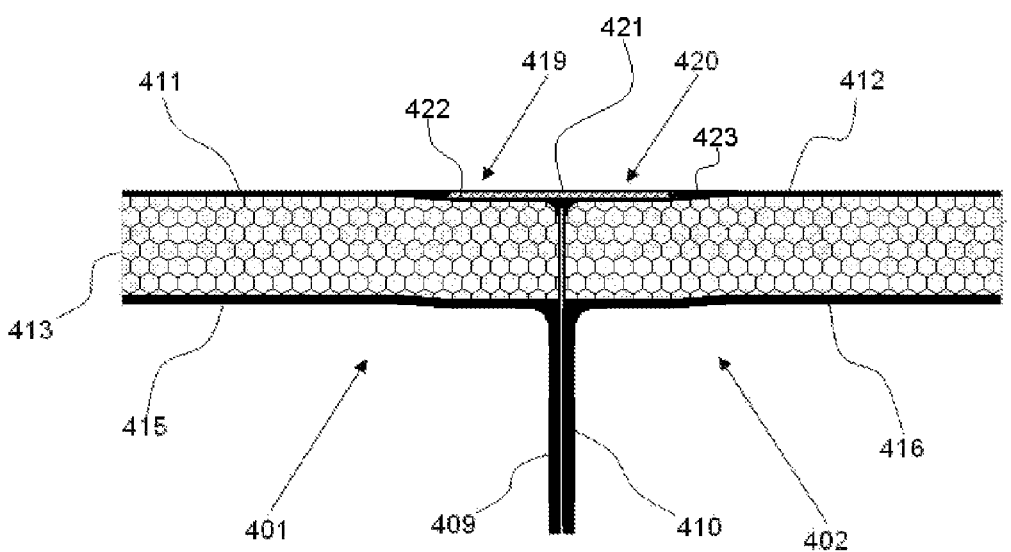
FIG. 5b shows a cross sectional view of the mould shell sections of FIG. 5a with a bridging sheet after attachment.

FIG. 5*b* shows the root mould shell section 401 and the tip mould shell section 402 after connection, with a bridging sheet 421 accommodated in the recessed portions 419, 420. The bridging sheet 421 fills up the recessed portions. An interface runs along the separation line 405 between the connecting edges 407, 408. The bridging sheet 421 is approximately flush with the root section mould surface 411 and the tip section mould surface 412. Hence, a transfer of unevenness due to the interface between the connecting edges 407, 408 to the blade shell half 32 is avoided to facilitate a smooth transition between mould shell sections 401, 402. The bridging sheet may also provide an airtight connection between the mould shell sections 401, 402, as required for some lamination procedures. The bridging sheet shall cover at least the interface between the connecting edges 407, 408 in the area of the mould surfaces where blade shells will be formed. In some embodiments, the bridging sheet 421 may be formed of a fibre-reinforced composite such as a laminate of a resin reinforced by a fibre material, such as glass fibre material or carbon fibre material, or a combination thereof. In some embodiments the bridging sheet 421 and the recessed portions 419, 420 are arranged to adhere to each other. Thereto, the surface of the recessed portions 419, 420 is prepared to enable adherence to the bridging sheet, for example by providing a certain surface roughness and/or a certain material. In FIG. 5*b* the bridging sheet 421 comprises a dry woven fabric 422 and a resin 423. Further embodiments of the bridging sheet comprise a non-woven fabric. In some embodiments the bridging sheet 421 is covered with a coat. In some of these embodiments the coat is a release layer preventing adhesion of a resin for the structure of the blade shell half 32. In some embodiments, the coat is formed as a gel coat. The coat may be shaped to adapt the bridging sheet to the root section mould surface 411 and the tip section mould surface 412. In some embodiments each of the recessed portions 419, 420 has a straight section with an oblong cross section adjoining the connecting edges 407, 408, and a tapered section tapering from the level of the straight section to the level of the normal level of the mould surfaces 411, 412. The straight section is particularly adapted to accommodate the fabric of the bridging sheet. The tapered section is particularly adapted to accommodate the resin and/or the gel coat. For example the straight section has a width of 60 mm and the straight section and the tapered section have a combined width of 100 mm. In further embodiments the ratio of the width of the straight section to the combined width is 3 to 5.

In FIGS. 5*a* and 5*b* the root mould shell section 401 and the tip mould shell section 402 are shown with respective flanges 409, 410. The flanges 409, 410 extend transversely in relation to the longitudinal direction of the mould along the separation line 405 and the connecting edges 407, 408, perpendicularly to the root section mould surface 411 and the tip section mould surface 412, and on a side of the mould shell sections 401, 402 opposing the side with the recessed portion 419, 420 and the mould surfaces 411, 412. When the root mould shell section 401 and the tip mould shell section 402 are engaged, the flanges 409, 410 abut against each other.

The flanges 409, 410 are arranged to provide facilities for adjustment means allowing adjustment of the mould shell sections 401, 402 to each other. The flanges 409, 410 are also arranged for attachment of the mould shell sections to each other. For this, attachment means such as rivets, bolts or screw bolts are provided. Thereby, the adjustment and/or attachment means adjoin the connecting edges 407, 408, such that displacement of a connecting edge with respect to the other connecting edge due to bending of one of the mould shell sections 401, 402 is avoided during an adjusting procedure as well as during use when the sections are connected. As the connecting edges 407, 408 support each other, they prevent that the mould shell sections 401, 402 incline towards the connecting edges 407, 408. Accordingly, alignment of the root section mould surface 411 and the tip section mould surface 412 is improved.

Figure 6:
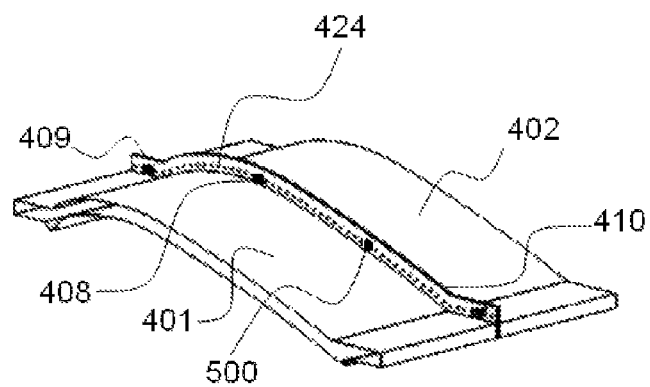
FIG. 6 is a perspective view on the bottom side of the mould shell sections with protruding flanges.

FIG. 6 is a perspective view of the flanges 409, 410 of the root mould shell section 401 and the tip mould shell section 402. Along the flange 409 of the root mould shell section 401a number of adjustment means 500 are provided. The shown parts of the adjustment means 500 are adjustment actuators, which are complemented by transfer means arranged on the flange 410 of the tip mould shell section 402 at positions corresponding to the adjustment actuators. In some embodiments the adjustment actuators are arranged on the flanges 409, 410 facing away from the respective other mould shell section. In these embodiments the transfer means protrude through the flanges 409, 410 to engage the adjustment actuators.

In the shown embodiment the flanges 409, 410 comprise a number of holes 424. The holes in the flanges 409, 410 of the root mould shell section 401 and the tip mould shell section 402 are approximately aligned to each other. The holes 424 provide facilities for attachment means for attaching the root mould shell section 401 and the tip mould shell section 402 to each other. Such attachment means are, for example, rivets, bolts or screw bolts. The flanges 409, 410 also provide facilities for the attachment of the adjustment means 500 and the transfer means. The holes provide passages for the transfer means.

Figure 7:
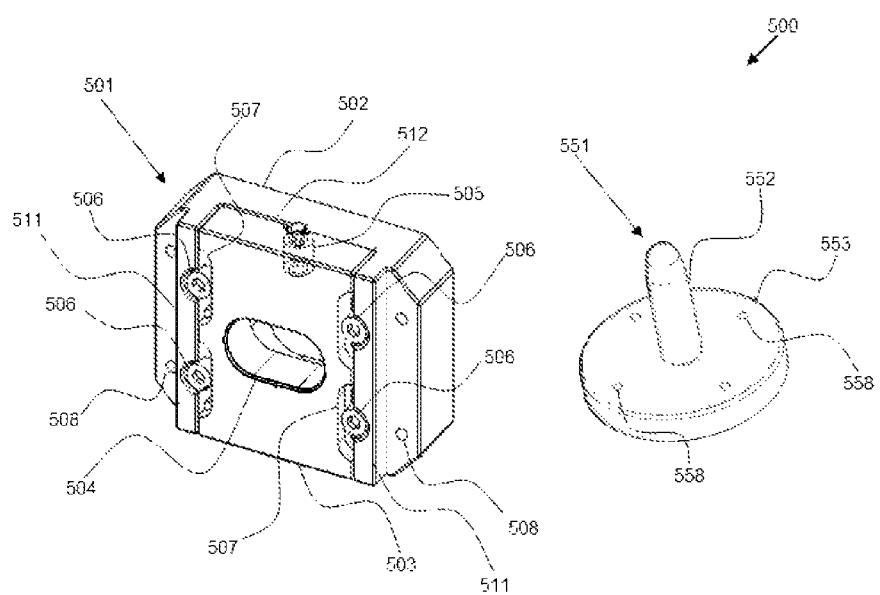
FIG. 7 illustrates adjustment means according to an aspect of the invention with an associated transfer means.

FIG. 7 shows embodiments of the adjustment actuator 501 and the transfer means 551. The adjustment actuator 501 comprises a guide part 503 for a corresponding part of the transfer means 551 and a frame 502 accommodating the guide part 503. The guide part 503 is guided linearly in the frame to be slidable to and fro in an adjustment direction. The guide part 503 comprises an elongated aperture 504, which elongates transversally to the adjustment direction. The frame 502 comprises a frame aperture which is aligned to the elongated aperture 504 of the guide part 503. The frame provides facilities 508 for attachment of the adjustment actuator 501 to the flanges 409, 410 of one of the mould shell sections 401, 402.

In an embodiment, the frame aperture extends along the entire frame and divides the frame 502 into two parts.

The frame 502 also comprises a gear as a means 505 for adjusting a position of the guide part 503 with respect to the frame 502 in the adjustment direction. In some embodiments the gear 505 comprises a gear, such as a worm gear, which shifts the guide part 503 with respect to the frame 502 in the adjustment direction in response to a rotation of the worm gear. The gear 505 is arranged between the frame 502 and the guide part 503, and engages both. In some embodiments the worm gear is a grub screw. In some embodiments the gear 505 is actuated manually, for example by a screw driver. In other embodiments the gear 505 is actuated by a hydraulic or electric actuator.

The frame 502 further comprises means 506 for fixing a position of the guide part 503 with respect to the frame 502. The guide part 503 comprises at least one elongated groove 507 extending in parallel to the adjustment direction. The means 506 for fixing a position engages the guide part 503 in the at least one elongated groove 507. In some embodiments the means 506 for fixing a position is a hexagon socket screw.

In the depicted embodiment the frame 502 encloses the guide part 503 from two opposite sides 511 to provide the linear guiding for the guide part 503. A third side 512 is arranged between the opposite sides 511 and in parallel to the adjustment direction next to the guide part 503. The third side 512 comprises a bearing for the gear 505 of the guide part 503 and the frame aperture. The at least one elongated groove 507 is arranged adjacent to at least one of the opposite sides. The means 506 for fixing a position of the guide part 503 penetrates an interface between the at least one of the opposite sides and the guide part 503 in parallel to the interface. Therefore, the at least one of the opposite sides 511 can prop up the means 506 for fixing a position against the guide part 503 and the respective other opposite side 511.

In the depicted embodiment four hexagon socket screws are provided as means for fixing a position, two hexagon socket screws penetrating the interface between each of the opposite sides 511 and the guide part 503. The hexagon socket screws engage the guide part 503 in four elongated grooves, two of which are respectively provided on each side of the guide part 503 adjacent to the opposite sides 511. The hexagon socket screws are threaded into the third side 512. The facilities 508 for attachment of the adjustment actuator 501 are arranged adjacent to the outer sides of the opposite sides.

The transfer means 551 comprises a spigot 552 and a base plate 553 with the spigot 552 protruding perpendicularly from the base plate 553. The spigot 552 has an approximately cylindrical shape and a rounded tip. The base plate comprises facilities 558 for attachment of the transfer means 551 to the respective other flange 410, 409.

The elongated aperture 504 extends in the adjustment direction by approximately the diameter of the spigot 552 and transversally to the adjustment direction by more than the diameter of the spigot 552. The elongated aperture acts as a guide for the transfer means 551, guiding the transfer means in the adjustment direction and allowing free travel of the transfer means transversally to the adjustment direction. Accordingly, the spigot 552 is guided by the elongated aperture 504 in the adjustment direction and may travel freely along the elongation of the elongated aperture 504. The frame aperture extends both in the adjustment direction and transversally to the adjustment direction by approximately at least the length of the elongated aperture 504 of the guide part. The length of the elongated aperture refers to the dimension of the elongated aperture along its elongation. Accordingly, the spigot 552 may travel freely in the frame aperture both in the adjustment direction and along the elongation of the elongated aperture 504.

FIG. 8a shows a number of the transfer means 551 attached to the flange 410 of the tip mould shell section 402 with a view to an engagement side of the flange 410. Additionally, details of the transfer means 551 are shown in an enlarged view A. The spigot 552 of the transfer means 551 is arranged to protrude the flange 410 through one of the holes 424 and to stick out from the flange 410 on the engagement side. A number of fastening members 561 penetrates the flange 410 to engage the base plate 553, which is arranged on a side of the flange 410 opposite to the engagement side.

FIG. 8b shows the transfer means 551 attached to the flange 410 of the tip mould shell section 402 with a view to the side opposite to the engagement side of the flange 410. Details of the transfer means 551 are shown in an enlarged view B. The fastening members 561 penetrate the base plate 553, such that their endings are visible.

Figure 9:
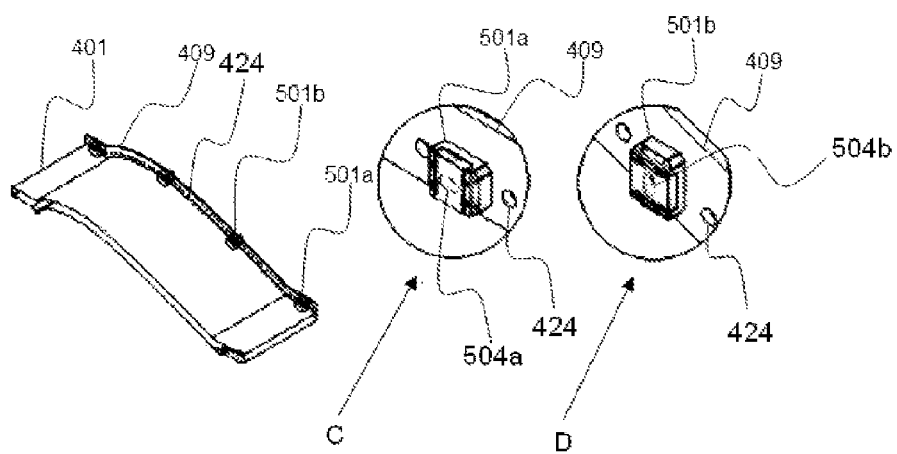
FIG. 9 shows a perspective view of a mould shell section with a number of adjustment actuators of the adjustment means.

FIG. 9 shows a number of first and second adjustment actuators 501a, 501b such as the adjustment actuator 501 described above attached to the flange 409 of the root mould shell section 401. Furthermore, details of the first and second adjustment actuators 501a, 501b are shown in enlarged views C, D. The first and second adjustment actuators 501a, 501b are mounted to the flange 409 such that their respective elongated aperture 504 is aligned to one of the holes 424 of the flange 409. In the enlarged view C a first adjustment actuator 501a is oriented with its elongated aperture 504a elongating transversally to the root mould shell section 401 in a chord-wise direction. In the enlarged view D of the depicted embodiment the second adjustment actuator 501b is oriented such that its elongated aperture 504b is oriented perpendicularly to the elongated aperture 504a of the first adjustment actuator 501a. Accordingly, the adjustment directions of the first and second adjustment actuators 501a, 501b are perpendicular to each other.

Figure 10:
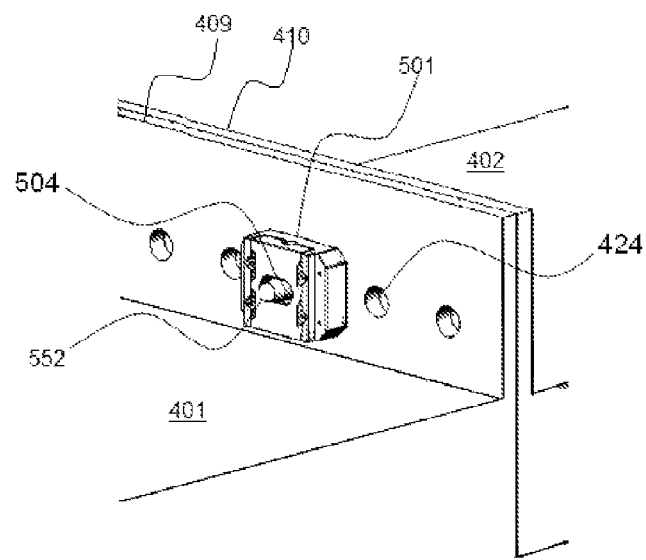
FIG. 10 shows a detail of mould shell sections engaging each other with an adjustment actuator and a spigot of a corresponding transfer means.

FIG. 10 shows a detail of the root mould shell section 401 and the tip mould shell section 402 engaging each other with the adjustment actuator 501 and a spigot 552 of a corresponding transfer means. The adjustment actuator 501 is attached to the flange 409 of the first root mould shell section, for example by fastening members engaging the facilities 508 for attachment of the adjustment actuator 501. The flanges 409, 410 abut against each other. The respective holes 424 in the flanges 409, 410 are aligned to each other to accommodate attachment means such as screw bolts. The spigot 552 of the transfer means 551 protrudes one of the holes 424 of the flange 410 of the tip mould shell section 402, a corresponding hole 424 of the root mould shell section 401 and the elongated aperture 504 of the adjustment actuator 501, such that the spigot 552 engages the elongated aperture 504. The elongated aperture 504 elongates transversally to the root mould shell section 401 and the tip mould shell section 402 in a chord-wise direction. Accordingly, the spigot 552 can travel freely transversally to the mould shell sections 401, 402 in a chord-wise direction and is guided to adjust a height of the root mould shell section 401 with respect to the tip mould shell section 402.

Figure 11:
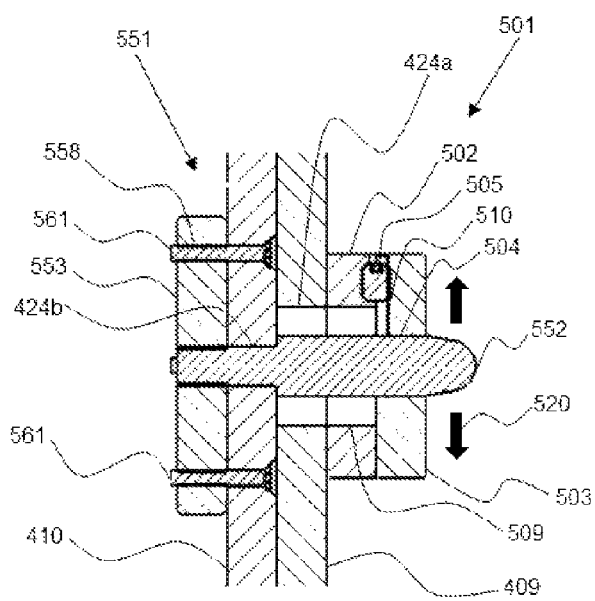
FIG. 11 shows a cross sectional view of the adjustment actuator and the transfer means according to the detail of FIG. 10.

FIG. 11 is a cross sectional view of the adjustment means 500 with the adjustment actuator 501 and the transfer means 551 according to the detail of FIG. 10. The transfer means 551 is attached to the flange 410 of the tip mould shell section 402 by the fastening members 561 engaging the facilities 558 for attachment of the transfer means 551. In some embodiments the fastening members 561 are screws. The spigot 552 passes the flange 409 of the root mould shell section 401 via a hole 424a, which has a larger diameter than the spigot 552, such that the spigot 552 may travel transversally to the hole 424. Likewise, as the frame aperture 509 was explained above to exceed the dimensions of the elongated aperture 504, the spigot 552 may travel freely transversally to the frame aperture 509.

The frame 502 also bears and abuts the gear 505 of the guide part 504. In the depicted embodiment the gear 505 is a worm gear engaging the guide part 504 in a threaded groove 510 extending in parallel to the adjustment direction 503. When the worm gear is rotated, the guide part 503 moves linearly in the adjustment direction 520.

In FIG. 11 the spigot 552 is also shown to abut against the guide part 503 in the elongated groove 504 from both sides in the adjustment direction 520. Accordingly, when the guide part 503 is moved, the guide part 503 engages the spigot 552 and the spigot 552 is taken along, such that the movement of the guide part 503 is transferred to the flange 410 and the tip mould shell section 402. Accordingly, the flange 410 and the tip mould shell section 402 move with respect to the flange 409 and the root mould shell section 401 in the adjustment direction 520 in response to a rotation of the worm gear.

Figure 12:
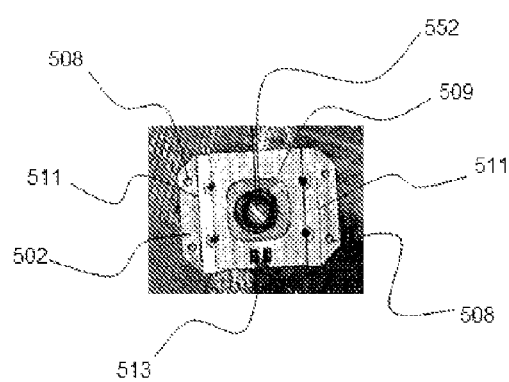
FIG. 12 shows a frame according to the invention without guide part 503.

FIG. 12 shows the frame 502 without guide part 503. The frame aperture 509 is arranged in the centre, with the spigot 552 in the centre of the frame aperture 509 being spaced from the boundary of the frame aperture 509. The opposite sides 511 are arranged laterally. The facilities 508 for attachment are provided on the periphery of the frame 502. The bearing 513 for the gear 505 described above is arranged on the third side 512 between the opposite sides 511.

In an alternative embodiment a spigot is attached to the guide part and engages a hole in the respective other mould shell section. The hole may have the shape of an elongated aperture to provide engagement in an adjustment direction and, to a certain extent, to provide free travel in a direction perpendicular to the adjustment direction.

For providing a smooth transition between the adjacent root mould shell section 401 and the tip mould shell section 402, the mould shell sections 401, 402 are initially positioned such that their connecting edges 407, 408 and their flanges 409, 410 engage each other.

In a further step, for providing adjustment means the adjustment actuator 501 is applied to one of the flanges 409, 410 of the mould shell sections 401, 402 and the transfer means 551 is applied to the respective other flange 410, 409, such that the spigot 552 protrudes both flanges and the frame 502 approximately perpendicularly, and engages the guide part 503 in the elongated hole 504. The adjustment actuator 501 is oriented to the mould shell sections 401, 402 to determine the adjustment direction 520. In some embodiments the adjustment direction 520 is oriented to provide height adjustment of the mould shell sections 401, 402 to each other.

Further adjustment means may be applied to provide height adjustment or chord-wise adjustment of the mould shell sections 401, 402 to each other.

In a further step the adjustment actuator 501 is actuated and adjusts the mould shell sections 401, 402 with respect to each other until their respective mould surfaces 411, 412 are approximately flush with respect to each other in areas of the mould surfaces 411, 412 adjacent to the first and second connecting edges 407, 408.

Additionally or alternatively to the adjustment means the bridging sheet 421 is inserted in the recessed portions 419, 420 of the mould shell sections 401, 402, such that portions of the bridging sheet 421 are approximately evenly distributed between both recessed portions 419, 420, whereby the interface between the mould shell sections 401, 402 is covered. The bridging sheet is arranged to cover at least the interface between the mould shell sections 401, 402 in the area of the mould surfaces where blade shells will be formed. In some embodiments inserting the bridging sheet 421 comprises applying a dry woven fabric in a first step and infusing a resin in a next step to obtain a fibre-reinforced composite layer. The fibre reinforced composite layer is covered with a coating, such as a gel coat, which is distributed to match up the mould surfaces 411, 412 of the mould shell sections 401, 402.

The invention claimed is:

1. A mould shell for forming a wind turbine blade comprising a first mould shell section having a longitudinal axis, the first mould shell section further comprising:
   a first mould surface for receiving a fibre-reinforced composite for the wind turbine blade; and
   a first connecting edge arranged laterally in relation to the longitudinal axis of the first mould shell section in a chord-wise direction of the first mould shell section, said first connecting edge being adapted to provide an interface for another mould shell section of said mould shell,
   wherein said first mould surface includes a first recessed portion adjoining said first connecting edge, said first recessed portion being adapted to accommodate a portion of a bridging sheet, and
   wherein the first recessed portion recesses from a normal level of the first mould surface, the first recessed portion comprising a straight section having an oblong cross section adjoining the first connecting edge, and a tapered section tapering from the level of the straight section to the level of the normal level of the first mould surface.

2. The mould shell according to claim 1, wherein said first recessed portion is dimensioned to allow the bridging sheet accommodated in the first recessed portion to form a flush surface with the first mould surface.

3. The mould shell according to claim 1, further comprising an adjustment device for adjusting said first mould shell section and another mould shell section relative to each other, wherein the adjustment device is arranged at the first mould shell section adjacent to the first connecting edge.

4. The mould shell according to claim 1, further comprising a flange extending along the first connecting edge, perpendicularly to the first mould surface and on a side of the first mould shell section opposing the first mould surface, said flange being arranged for attachment of said first mould shell section to a flange of another mould shell section and/or having facilities for attachment of an adjustment device for adjusting said first mould shell section relative to the other mould shell section.

5. The mould shell according to claim 1, further comprising a second mould shell section having a longitudinal axis, the second mould shell section comprising:
   a second mould surface for receiving a fibre-reinforced composite for the wind turbine blade; and
   a second connecting edge arranged laterally in relation to the longitudinal axis of the second mould shell section in a chord-wise direction of the second mould shell section,
   wherein said second mould surface includes a second recessed portion adjoining said second connecting edge, said second recessed portion being adapted to accommodate a portion of a bridging sheet,
   wherein the second recessed portion recesses from a normal level of the second mould surface, the second recessed portion comprising a straight section having an oblong cross section adjoining the second connecting edge, and a tapered section tapering from the level of the straight section to the level of the normal level of the second mould surface,
   wherein said first and second mould shell sections engage each other along their respective connecting edges, and
   wherein the mold shell further comprises a bridging sheet accommodated in the recessed portions of the first and second mould shell sections, the bridging sheet being arranged to fill up the recessed portions.

6. The mould shell according to claim 5, wherein said bridging sheet comprises a gel coat covering the laminate and being matched to the mould surfaces of the mould shell sections.

7. The mold shell according to claim 5, further comprising an adjustment device for mutually adjusting the first and second mould shell sections of a mould shell for forming the wind turbine blade, said adjustment device comprising:
   a frame for attachment of said adjustment device to the first mould shell section;
   a guide part being adapted to engage the second mould shell section and being adapted to slide in said frame in an adjustment direction to guide an engagement position of the first mould shell section with said second mould shell section in the adjustment direction; and
   means for adjusting and/or fixing a position of said guide part with respect to said frame.

8. The mould shell according to claim 7, wherein guiding an engagement position of the first mould shell section with said second mould shell section comprises guiding said second mould shell section in the adjustment direction.

9. The mould shell according to claim 7, wherein said guide allows free travel of the engagement position transversally to said adjustment direction.

10. The mould shell according to claim 7, wherein said means for adjusting and/or fixing a position comprise a worm gear and said guide part is adapted to slide in said frame along the adjustment direction in response to an action of the worm gear.

11. The mould shell according to claim 7, further comprising a spigot for transferring the movement of the guide part to the second mould shell section.

12. The mould shell according to claim 11, further comprising a transfer device attached to the second mould shell section, wherein said transfer device comprises said spigot, and wherein said guide part comprises an elongated aperture extending transversely to the adjustment direction and being adapted to engage the spigot, and wherein said frame has a frame aperture, which is aligned to said elongated aperture, said frame aperture extending in said adjustment direction and said direction transversal to said adjustment direction by approximately at least the length of the elongated aperture of the guide part.

13. The mould shell according to claim 11, wherein said spigot is attached to the guide part.

14. A method for providing a smooth transition between adjacent mould shell sections for a mould shell for forming a wind turbine blade, comprising:
   providing a first mould shell section comprising a first mould surface for receiving a fibre-reinforced composite for the wind turbine blade and a first connecting edge arranged laterally in relation to a longitudinal axis of the first mould shell section in a chord-wise direction of the first mould shell section, wherein the first connecting edge is adapted to provide an interface for another mould shell section of the mould shell, wherein the first mould surface includes a first recessed portion adjoining the first connecting edge, the first recessed portion being adapted to accommodate a portion of a bridging sheet, and wherein the first recessed portion recesses from a normal level of the first mould surface, the first recessed portion comprising a straight section having an oblong cross section adjoining the first connecting edge, and a tapered section tapering from the level of the straight section to the level of the normal level of the first mould surface;

providing a second mould shell section comprising a second mould surface for receiving a fibre-reinforced composite for the wind turbine blade and a second connecting edge arranged laterally in relation to a longitudinal axis of the second mould shell section in a chord-wise direction of the second mould shell section, wherein the second mould surface includes a second recessed portion adjoining the second connecting edge, the second recessed portion being adapted to accommodate a portion of a bridging sheet, and wherein the second recessed portion recesses from a normal level of the second mould surface, the second recessed portion comprising a straight section having an oblong cross section adjoining the second connecting edge, and a tapered section tapering from the level of the straight section to the level of the normal level of the second mould surface, arranging the first mould shell section and the second mould shell section adjacent to each other such that the first and second connecting edges face each other;

adjusting said first and second mould shell sections such that the first and second mould surfaces are approximately flush with respect to each other in areas of the mould surfaces adjacent to the recessed portions; and applying a bridging sheet in the first and second recessed portions such that the bridging sheet fills up the recessed portions.

15. The method according to claim 14, wherein adjusting said first and second mould shell sections is carried out by an adjustment device adapted to adjust a height of said first and second mould shell sections with respect to each other and to provide free travel of said first and second mould shell sections with respect to each other in a chord-wise direction.

16. The mould shell according to claim 5, wherein said first mould shell section comprises a first flange running along the first connecting edge perpendicularly to the first mould surface on a side of the first mould shell section opposing the first mould surface, and said second mould shell section comprises a second flange running along the second connecting edge perpendicularly to the second mould surface on a side of the second mould shell section opposing the second mould surface, and further comprising an adjustment actuator of an adjustment device arranged on the first flange and a spigot on the second flange, such that the spigot protrudes said first and second flanges and said adjustment actuator.

17. The method according to claim 14, wherein applying a bridging sheet comprises applying a gel coat and matching said gel coat up to said first and second mould surfaces.

18. A method for manufacturing a wind turbine blade, comprising:

providing a mould shell comprising the first and second mould shell sections;

providing a smooth transition between the first and second mould shell sections according to claim 14; and placing fibres and a resin in the mould shell, said fibres and said resin forming a first shell half of the wind turbine blade.

19. The method according to claim 18, further comprising providing a second shell half of the blade, positioning the second shell half on the first shell half, and coupling the first and second blade shell halves to each other.

* * * * *